United States Patent
Miller et al.

(10) Patent No.: US 6,859,304 B2
(45) Date of Patent: Feb. 22, 2005

(54) PHOTONIC CRYSTALS AND DEVICES HAVING TUNABILITY AND SWITCHABILITY

(75) Inventors: Robert O. Miller, Bedford, MA (US); David Tsu, Auburn Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 197 days.

(21) Appl. No.: 10/216,404

(22) Filed: Aug. 9, 2002

(65) Prior Publication Data

US 2004/0027646 A1 Feb. 12, 2004

(51) Int. Cl.[7] .............................. G02F 1/00; G02F 1/01; H01Q 13/00; H01L 31/00; G11C 13/00
(52) U.S. Cl. ...................... 359/322; 359/237; 359/245; 359/279; 359/321; 359/332; 359/361; 343/786; 343/787; 343/909; 365/113; 365/163; 369/275.2; 250/214.1; 257/2
(58) Field of Search ................................. 359/322, 237, 359/245, 238, 278, 279, 321, 326, 332, 350, 361; 343/772, 786, 787, 895, 909; 365/113, 163; 369/275.2; 250/214.1; 257/2, 4

(56) References Cited

U.S. PATENT DOCUMENTS

| | | | | |
|---|---|---|---|---|
| 5,272,667 A | * | 12/1993 | Yamada et al. | 365/113 |
| 5,389,943 A | * | 2/1995 | Brommer et al. | 343/909 |
| 5,689,275 A | * | 11/1997 | Moore et al. | 343/786 |
| 5,825,046 A | * | 10/1998 | Czubatyj et al. | 257/2 |
| 5,999,308 A | * | 12/1999 | Nelson et al. | 359/321 |
| 6,011,757 A | * | 1/2000 | Ovshinsky et al. | 369/13.35 |
| 6,141,241 A | * | 10/2000 | Ovshinsky et al. | 365/163 |
| 6,278,105 B1 | * | 8/2001 | Mattia | 250/214.1 |
| 6,483,640 B1 | * | 11/2002 | Tonucci et al. | 359/361 |
| 2003/0048744 A1 | * | 3/2003 | Ovshinsky et al. | 369/275.2 |

* cited by examiner

Primary Examiner—Loha Ben
(74) Attorney, Agent, or Firm—Kevin L. Bray; Marvin S. Siskind

(57) ABSTRACT

A photonic crystal having reversibly tunable photonic properties. The photonic crystal includes a phase change material having a plurality of structural states that vary with respect to fractional crystallinity. Optical constants including refractive index, extinction coefficient and permittivity vary as the fractional crystallinity of the phase change material is varied thereby providing tunability of photonic crystal properties. Variations among the structural states of the phase change material are reversibly effected through the addition of energy in forms including optical or electrical energy. The photonic crystals may include defects that provide photonic states within the photonic band gap. The position of these states is tunable through the control of the fractional crystallinity of the phase change material included in the photonic crystal. Electromagnetic radiation resonators including photonic crystals having photonic states in the photonic band gap are further provided. These resonators may be used for frequency selective filtering or routing of electromagnetic radiation and permit tunable variation in the frequency and decay rates of resonant modes through control of the structural state of the phase change material. These resonators are further coupled to waveguides to provide tunable channel drop filters and narrowband reflectors.

51 Claims, 7 Drawing Sheets

$Ge_2Sb_2Te_5$ Optical Constants: amorphous (top), polycrystalline (bottom)

PHOTONIC CRYSTALS AND DEVICES HAVING TUNABILITY AND SWITCHABILITY

FIELD OF THE INVENTION

The instant invention relates to photonic crystals whose properties can be reversibly tuned or switched and devices for controlling the propagation of electromagnetic radiation that incorporate such crystals. More particularly, this invention relates to photonic crystals that are convertible among two or more structural states thereby enabling reversible variable control of the propagation and modulation of electromagnetic radiation. Most particularly, this invention relates to photonic crystals, electromagnetic radiation resonators, frequency selective filters and optical modulators whose performance is dynamically tunable.

BACKGROUND OF THE INVENTION

The role of semiconductors in modem computers and electronic devices can hardly be understated. Semiconductor materials make possible basic components such as transistors, diodes, LEDs, lasers, memory, solar cells, and sensors that enable a range of devices and technologies. Most of the tremendous economic impact associated with the information industry is attributable to the development and advances in semiconductor materials and processing with silicon being far and away the most important material. These advances continue today as researchers and companies continue to discover new materials for new applications and new processing technologies. Examples of current activity include blue lasers and emitters as exemplified by GaN and related materials as well as techniques for miniaturizing devices and feature size as exemplified by deep UV and x-ray lithography.

The device capabilities afforded by semiconductors is a consequence of their unique electronic properties. An important feature of a semiconductor is the presence of an electronic and gap between the electronic states of the valence and conduction bands. The electronic band gap represents a range of energy extending from the valence band edge to the conduction band edge in which no electronic states are present in an intrinsic semiconductor. The presence of a band gap provides an ability to exercise substantial control over the flow of electrons within and through a semiconductor. Further control of conductivity can be achieved by including dopants in a semiconductor composition. Dopants are examples of defects that interrupt the regular periodicity of a semiconductor lattice thereby providing a mechanism for introducing electronic states and carriers in the electronic band gap. Other defects include impurities and structural irregularities such as vacancies and interstitial atoms. Electronic states associated with defects provide the n and p type conductivity typically associated with semiconductors. The nature of defects (e.g. chemical identity of dopants or interstitial atoms, specific form of structural irregularity etc.) determines the energy of defect electronic states relative to the valence or conduction band edges. The concentration of defects determines the number of defect electronic states in the band gap as well as the number of electrons that can occupy those states. Since defects can provide occupied and unoccupied electronic states in close energetic proximity to the conduction and valence band edges, respectively, they provide for enormous flexibility in controlling the conductivity and flow of current through semiconductor materials. This flexibility is at the heart of the tremendous latitude afforded by semiconductors for controlling the flow of electrons that is responsible for virtually all of the important effects associated with computers and other electronic devices. In essence, semiconductors provide an ability to precisely control and direct current flow through the control of the electronic band gap, number density of electronic states and charge carriers, energies of electronic states, doping strategies, defects and chemical composition.

Attention recently has been focused on developing materials capable of controlling the propagation of light in much the same way that semiconductors control the propagation of electrons. Over the past decade substantial progress has been made toward this goal and the new field of photonic crystals has emerged. A photonic crystal functions as a "semiconductor for light" in the sense that it may possess a photonic band gap that defines a range of electromagnetic frequencies that are unable to propagate in the crystal. In the most fundamental sense, the ability of semiconductors to control the propagation of electrons originates from the periodic lattice arrangement of the atoms that constitute the semiconductor. The precise arrangement and spacing of atoms ultimately dictates the band structure and electronic states of a semiconductor. Periodicity is also a key concept in photonic crystals. Instead of atoms, however, the periodic building block of a photonic crystal is a macroscopic dielectric medium. An example of a photonic crystal would be a material that consists of a flat dielectric slab that contains a periodic arrangement of small holes aligned along the thin dimension of the slab. Such a material may be viewed as a periodic arrangement of rods comprised of air and corresponds to a photonic crystal in which air is the macroscopic dielectric medium.

The precise details of the periodic pattern of rods and the refractive index contrast between the periodic macroscopic dielectric medium and its surroundings influences the properties of the crystal. In the preceding example, the flat dielectric slab has a high refractive index, while the air holes have a low refractive index. The refractive index contrast of a photonic crystal functions with respect to photon propagation much like the electronic potential of atoms in a semiconductor functions with respect to electron motion. A periodic lattice arrangement of macroscopic dielectric media such as rods provides photonic analogues of many of the electronic properties associated with the lattice periodicity of atoms in a semiconductor. The most important of these analogue properties is the photonic band gap. Light having an energy within the photonic band gap and propagating in a direction defined by the photonic band gap is blocked and unable to propagate in a photonic crystal. When external light having an energy and direction of propagation within the photonic band gap is made incident to a photonic crystal, it is unable to propagate through the crystal. Instead, it is perfectly reflected. Light with an energy or direction of propagation outside of the photonic band gap, on the other hand, freely passes through the crystal (subject, of course to ordinary absorption and reflection processes).

Photonic crystals can be formed from a wide variety of macroscopic dielectric media provided that an appropriate refractive index contrast with a surrounding medium can be achieved. As an example, the composition of the holes or rods in the example above is not limited to air. Other materials that present a sufficiently large refractive index contrast with the surrounding flat dielectric slab may be used to form the rods. A periodic lattice of air holes, for example, may be drilled in a flat dielectric slab and subsequently filled with another material to form a photonic crystal. The rod material may have a higher or lower refractive index than the slab material. As another example, a periodic array of rods comprised of a macroscopic dielectric medium such as silicon in air as the surrounding medium represents a photonic crystal.

Important material design considerations include the size, spacing and arrangement of macroscopic dielectric media within a volume of surrounding material as well as the refractive indices of the dielectric and surrounding materials. The periodicity of the macroscopic dielectric media can extend in one, two or three dimensions. These considerations influence the magnitude of the photonic band gap, the frequency range of light or other electromagnetic energy (e.g. infrared, microwave etc.) that falls within the photonic band gap and whether the photonic band gap is full (in which case the photonic band gap effect is manifested regardless of the direction of propagation of the incident light) or partial (in which case the photonic band gap effect is manifested for some, but not all, directions of propagation). Other practical considerations are also relevant such as manufacturability, cost, ability to fabricate a periodic array of rods etc.

Effects analogous to doping or defects in semiconductors may also be realized in photonic crystals. An inherent consequence of dopants or defects in semiconductors is a disruption or interruption of the periodicity of the lattice of atoms that constitute the semiconductor. The electronic states associated with dopants or defects are a direct consequence of the local disturbance in periodicity imparted to the semiconductor lattice. Photonic crystals can similarly be perturbed in ways analogous to introducing dopants and defects in semiconductors. The periodicity of a photonic crystal is a consequence of a regular and ordered arrangement of macroscopic dielectric media (e.g. rods) within a surrounding medium (e.g. dielectric slab). Effects that interrupt the arrangement of macroscopic dielectric media can be used to break the periodicity to create photonic states within the photonic band gap. Possible ways of perturbing an array of rods in a surrounding dielectric slab, for example, include varying the size, position, optical constants, chemical composition of one or more rods or forming rods from two or more materials. The ability to create photonic states within the photonic band gap provides further flexibility in controlling the frequencies and directions of incident light that are reflected, redirected, localized or otherwise influenced by a photonic crystal.

It is widely expected that photonic crystals will be the basis of next generation information, optical and communication systems. Many people believe that the potential ability to control the propagation of light offered by photonic crystals may exceed the ability of semiconductors to control the propagation of electrons and that a commensurately greater economic benefit will result as new technologies and industries based on photonic crystals that are able to selectively inhibit, direct or localize the propagation of light in increasingly complex ways. The technological areas in which photonic crystals are projected to make an impact continue to grow in scope and kind. Projected applications include LEDs and lasers that emit light in very narrow wavelength ranges or that are of nanoscopic dimensions, direction selective reflectors, narrow wavelength optical filters, microcavities for channeling light, color pigments, high capacity optical fibers, integrated photonic and electronic circuits that combine photonic crystals and semiconductors to produce new functionality, devices for light confinement, optical switches, modulators, and miniature waveguides.

As the field of photonic crystals develops, the need for new photonic band gap materials is increasing. A much needed feature to enhance the flexibility and range of applications of photonic crystals is an ability to adjust the properties of a photonic crystal so that its' performance can be tuned in degree or kind or even switched on and off reversibly as needed. In a wavelength selective filter, for example, a particular photonic crystal has the ability to select a particular frequency of light from within a broadband input and can preferentially transmit or reflect it. In such an application, it would be desirable to change the performance of the photonic crystal so that it has the ability to select different wavelengths according to the needs of a particular situation. In one situation, for example, it may be desirable to select green wavelengths and in another situation it may desirable to select red wavelengths. When an electromagnetic radiation resonator, as a second example, is coupled to two waveguides, it may enable a frequency selective transfer or routing of electromagnetic radiation from one waveguide to the other. In such an application, it may be desirable to invoke the routing on command to achieve greater control over the propagation of light. It is desirable therefore to have materials such as photonic crystals and devices for controlling the propagation of electromagnetic radiation whose performance is readily tunable or whose effect is reversibly switched on or off.

SUMMARY OF THE INVENTION

The instant invention provides photonic crystals whose properties can be reversibly tuned or switched and devices for controlling the propagation of electromagnetic radiation that incorporate such crystals. The instant photonic crystals include a phase change material that is capable of being reversible transformed among two or more structural states.

DETAILED DESCRIPTION

Figure 1:
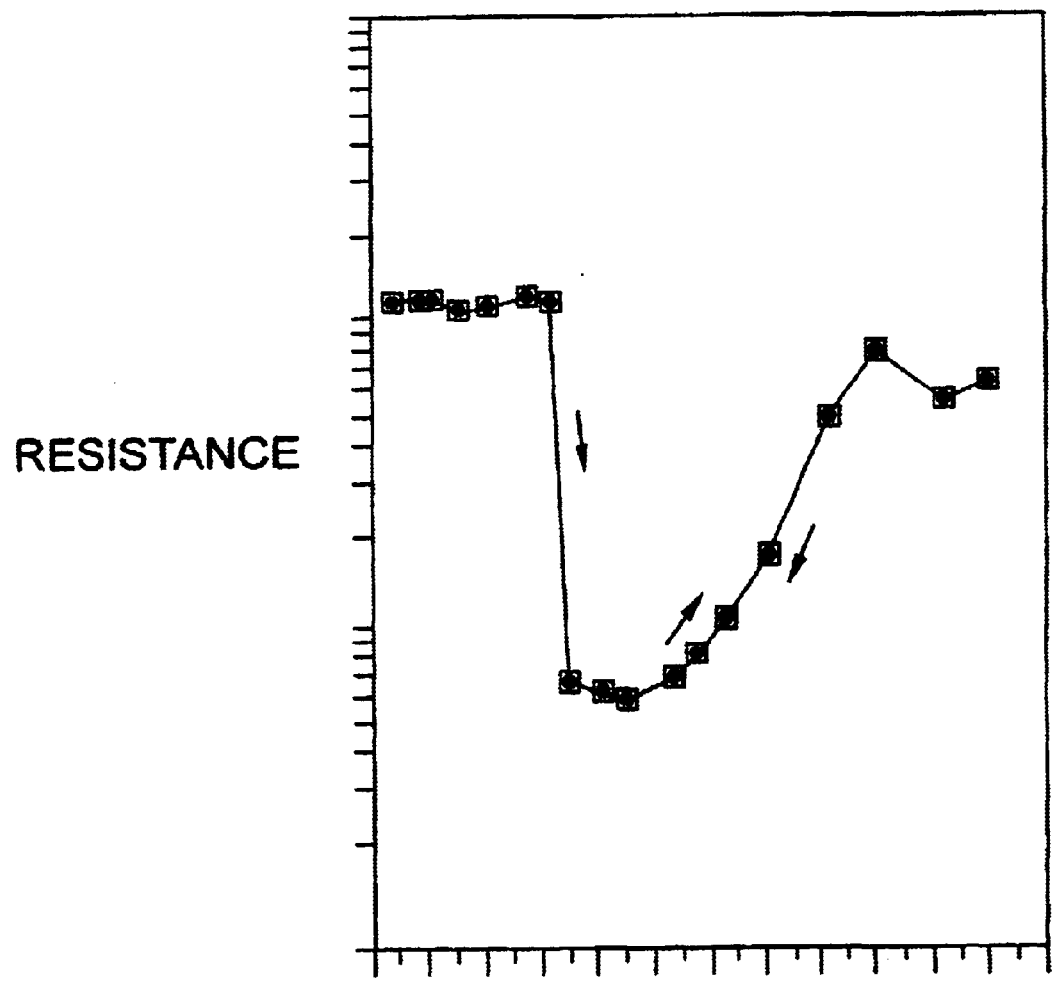
FIG. 1 Schematic depiction of the states of a phase change material. The electrical resistance of the states as a function of energy or power is plotted.

The instant invention provides photonic crystals with properties that can be reversibly tuned or switched as well as electromagnetic radiation propagation and routing devices that exploit these crystals. A photonic crystal may be viewed as an assembly of units comprising a macroscopic dielectric medium within a surrounding medium. The properties of photonic crystals are determined by the permittivity or refractive index contrast between the macroscopic dielectric medium and its surroundings; the size and shape of the units of macroscopic dielectric medium or media that are assembled to form the photonic crystal; the arrangement and dimensionality of these units in a lattice configuration within the surrounding medium; and the presence and properties of defects within the lattice.

The properties of photonic crystals are difficult to vary once a photonic crystal is formed because variables such as the size, shape, lattice arrangement, refractive index, and chemical composition of the units of macroscopic dielectric medium as well as the properties of lattice defects are fixed upon formation or fabrication of the photonic crystal. To illustrate the difficulties associated with modifying a photonic crystal, consider a two-dimensional photonic crystal comprised of a periodic array of cylindrical rods of a macroscopic dielectric medium in air as the surrounding medium where the rods are of uniform size and composition. In such a photonic crystal, a defect may be created by altering the diameter of a single rod in the array. If the crystal is used as a resonator or microcavity, for example, the diameter of the defect rod with respect to the remaining rods in the array dictates the frequency of the resonant mode (or modes) supported by the microcavity. In principle, the frequency of the resonant mode may be tuned by adjusting the diameter of the defect rod. In practice, however, such tuning is difficult to implement because material must be added to or removed from the defect rod in a precise way without affecting other rods in order to change its diameter. It is similarly difficult to completely remove a defect rod or to replace it with a rod having a different chemical composition or refractive index than surrounding rods or to selectively alter the properties of one or more surrounding rods in order to tune the properties of a photonic crystal. These and related manipulations of the structure and/or composition of the features and arrangement of the units of macroscopic dielectric media are prohibitively impractical and as a result, practical tunable and switchable photonic crystals are largely lacking in the art.

The instant invention provides a more convenient strategy for achieving tunability and switchability in photonic crystals and devices. As used herein, tunability refers to adjusting the performance of a photonic crystal with respect to its frequency selectivity or degree of effectiveness in influencing the propagation of electromagnetic radiation. Tunability, for example, includes the ability to vary the performance of a photonic crystal with respect to one or more frequencies relative to other frequencies as well as the ability to vary the performance of a photonic crystal with respect to a particular frequency. The latter capability may hereinafter be referred to as modulation or a modulation effect.

As used herein, switching refers to enabling or disenabling the performance of a photonic crystal in an ON/OFF operational sense. In the ON state, photonic crystal effects are manifested to at least some extent with respect to a particular frequency of electromagnetic radiation of interest. Hence, while in the ON state, a photonic crystal is able to influence the propagation of the particular frequency of electromagnetic radiation according to any of the effects intrinsic to the photonic crystalline state of matter. Effects intrinsic to the photonic crystalline state are known in the art and are described in, for example, *Photonic Crystals* by J. D. Joannopoulos, R. D. Meade, and J. N. Winn (Princeton University Press, 1995); "Photonic Crystals" by E. Yablanovitch in the Journal of Modern Optics vol. 41, p. 173 (1994); "Channel drop filters in photonic crystals" by S-H. Fan in Optics Express vol. 3, p. 4 (1998); and "Photonic band gap formation and tunability of certain self organizing systems" by S. John and K. Busch in the Journal of Lightwave Technology vol. 17, p. 1931 (1999). In the OFF state, photonic crystal effects are not manifested with respect a particular frequency of electromagnetic radiation of interest. Although a photonic crystal in the OFF state does not influence the propagation of light according to effects intrinsic to the photonic crystalline state, it may influence the propagation of light according to ordinary optical effects such as reflection, refraction, etc. ON/OFF switching refers to the enabling and disenabling of effects intrinsic to the photonic crystalline state. Unless otherwise stated herein, reference to influencing the propagation of light or the like shall refer to manifestation of an effect intrinsic to the photonic crystalline state. As used herein, the term propagation broadly refers to the state, intensity and/or path of one or more frequencies of light as it moves from one position in space to another. Propagation, for example, encompasses the concept of routing, which may be viewed as the directional control of the motion of light.

A photonic crystal that includes a phase change material and devices incorporating same are herein disclosed. Phase change materials are materials that exhibit a modification of structure upon the addition of energy. Many properties and compositions of phase change materials are known in the art and have been discussed previously, for example, in U.S. Pat. Nos. 3,271,591; 3,530,441; 4,653,024; 4,710,899; 4,737,934; 4,820,394; 5,128,099; 5,166,758; 5,296,716; 5,534,711; 5,536,947; 5,596,522; 5,825,046; 5,687,112; 5,912,104; 5,912,839; 5,935,672; 6,011,757; and 6,141,241 to the instant assignee, as well as U.S. patent application Ser. No. 10/026395 to the instant assignee, the disclosures of which are hereby incorporated by reference. A brief review of some of these properties and compositions as they pertain to the instant photonic crystals and devices is presented in the following several paragraphs.

A characteristic feature of the phase change materials contemplated in the instant invention is the capability of reversibly transforming among crystalline, partially crystalline and amorphous structural states. A volume of phase change material possesses a series of structural states extending from purely amorphous to purely crystalline and including a plurality of intermediate states having partial crystallinity in which a volume of phase change material includes crystalline regions as well as amorphous regions. The structural states of a phase change material may be characterized in terms of a fractional or percent crystallinity, where the fully amorphous state corresponds to 0% crystallinity and the fully crystalline state (including the single crystal and polycrystalline embodinents) corresponds to a crystallinity of 100%. Partially crystalline structural states have a fractional crystallinity between the amorphous and crystalline limits. Fractional crystallinity is a measure of the relative abundance of crystalline regions within a phase change material.

The application of energy to a phase change material induces transformations among its structural states. The relevant considerations are discussed more fully in the U.S. patents incorporated by reference hereinabove and are now briefly reviewed. Phase change materials have characteristic melting and crystallization temperatures and the structural state may be influenced through the controlled application of energy vis-a-vis these temperatures. Application of energy sufficient to heat a phase change material above its melting temperature followed by rapid quenching promotes the formation of an amorphous phase. Slow quenching, on the other hand, may permit crystallization and the formation of crystalline regions within the phase change material to provide partially crystalline or crystalline materials. Application of energy in an amount sufficient to heat a phase change material to between its crystallization and melting temperatures may induce a partial or complete transformation of amorphous regions to a crystalline phase.

Whether or not crystalline regions form from amorphous regions and the extent to which they form depend on the amount of energy applied to the phase change material and/or the power (i.e. rate of addition of energy) applied. The amount of energy and/or power necessary to induce formation of crystalline regions or to modify existing crystalline regions in a phase change material through growth or depletion depends on factors such as the chemical composition of the phase change material, the initial state of the phase change material, and the kinetics and thermodynamics of crystal nucleation and growth processes.

Energy may also be applied to selected portions of a volume of phase change material to induce localized structural transformations without disturbing surrounding portions of the phase change material. Such localized structural transformations may also be used to alter the fractional crystallinity of a volume of phase change material. Phase stabilization and transformations among structural states are thus seen to be influenced by factors that include the kinetics and thermodynamics of crystallization processes, the distribution and flow (e.g. dissipation, diffusion, conduction) of energy within the phase change material as well as the intensity, duration and spatial distribution of applied energy.

Transformations among structural states are effected upon the application of energy to a phase change material, or portions thereof, in appropriate amounts at appropriate rates. Energy in various forms may be used to effect transformations among structural states. The energy may be in the form of electromagnetic radiation (including infrared, optical, laser and microwave sources), electrical energy, thermal energy, chemical energy, magnetic energy, mechanical energy, particle beam energy, acoustic energy or combinations thereof using a single energy source or a plurality of energy sources. Delivery of electrical energy, for example, may be in the form of electrical current or voltage and may be continuous or in the form of a pulse whose height and width can be controlled. Optical energy may be in the form of a pulsed or continuous laser beam having a controlled wavelength, lineshape, energy and/or power. A diode laser is one example of an optical energy source suitable for use in the instant invention. Optical sources are convenient because they do not require physical connections to be made to a phase change material in order to provide the energy or power necessary to effect a transformation among structural states.

U.S. Pat. Nos. 3,271,591; 3,530,441; 5,166,758; 5,296,716; 5,534,711; 5,536,947; 5,596,522; 5,825,046; 5,687,112; 5,912,839; and 6,141,241 incorporated by reference hereinabove describe examples of transformations among structural states that may occur within a volume of phase change material. Much of the discussion in these patent references considers energy applied in the form of electrical energy (for example, voltage or current pulses of various amplitudes and durations), but other forms of energy when applied in appropriate amounts and at appropriate rates are expected to induce similar structural transformations.

The structural transformations described in U.S. Pat. Nos. 3,271,591; 3,530,441; 5,166,758; 5,296,716; 5,534,711; 5,536,947; 5,596,522; 5,825,046; 5,687,112; 5,912,839; and 6,141,241 incorporated by reference hereinabove may be conveniently described with reference to FIG. 1. FIG. 1 illustrates the general dependence of the electrical resistance of selected structural states (depicted with symbols) of a phase change material as a function of energy or power. For the purposes of the instant invention, two regimes of behavior may be discerned in FIG. 1: an accumulation region on the left side and a reversible region on the right side. The two regimes are demarcated by an abrupt decrease in electrical resistance value. The abrupt decrease in electrical resistance may be referred to as a setting transformation. Structural states within the accumulation region are characterized by substantially uniform electrical resistance values, while structural states within the reversible region are characterized by a wide variation of electrical resistance values.

The accumulation region of FIG. 1 describes a series of structural states having substantially identical electrical resistance values. Structural states within the accumulation region may be amorphous, substantially amorphous or partially crystalline. The fractional crystallinity of structural states within the accumulation region increases in the direction of increasing applied energy or power. Thus, the fractional crystallinity increases upon increasing energy or power in the accumulation region and the effects of energy are cumulative in the accumulation region. The increase in fractional crystallinity may be due to the formation of new crystalline regions in the phase change material, the growth of existing crystalline regions or a combination thereof.

If a sufficient cumulative amount of energy is applied (in a single or multiple applications of energy), the behavior regime describing the phase change material changes from the accumulation region to the reversible region. The abrupt decrease in electrical resistance corresponds to the conversion of the phase change material from the accumulation region to the reversible region. The structural state in the reversible region having the lowest energy is the set state. The conversion of the phase change material from its accumulation region to its reversible region is referred to as "setting" or "to set" the phase change material.

While not wishing to be bound by theory, the instant inventors believe that entry into the reversible regime of behavior through establishment of the low resistance set state is a consequence of the formation of a contiguous crystalline pathway through the phase change material. Upon application of energy in the accumulation region, a phase change material is believed to progress through a series of partially crystalline states having increasing fractional crystallinity. It is believed by the instant inventors in the accumulation region, the crystalline regions are dispersed in an amorphous phase in such a way that a contiguous crystalline pathway through the phase change material is absent. Since the amorphous phase has a higher electrical resistance than the crystalline phase, absence of a contiguous crystalline network leads to a high electrical resistance for a phase change material in the accumulation region.

The application of energy to structural states of a phase change material in the accumulation region is believed by the instant inventors to increase the relative abundance of a crystalline phase through the formation of new crystalline regions or growth of existing crystalline regions. Provided that a contiguous crystalline network does not form, increased abundance of a crystalline phase does not substantially influence the electrical resistance of a phase change material. Formation of a contiguous crystalline network is believed by the instant inventors to occur during the setting transformation and the decrease in electrical resistance that accompanies the setting transformation is believed to result from the availability of conductive pathways through the contiguous crystalline phase. It is this formation of a contiguous crystalline pathway that is believed by the instant inventors to coincide with the conversion from the accumulation regime to the reversible regime of behavior. Since the crystalline phase has a lower resistance than the amorphous phase, the presence of a contiguous crystalline network leads to a lower electrical resistance.

In the reversible region, applied energy may influence the crystalline network. The addition of energy may lead to heating and an increase in the temperature of a phase change material. If sufficient energy is applied to a phase change material it may be possible to melt or to produce a high mobility state or otherwise thermally disrupt the contiguous crystalline network formed upon setting. If melting or inducement of a suitable high mobility state occurs, subsequent cooling may lead to a phase change material having a different abundance or connectivity of crystalline regions. Melting, inducement of a high mobility state or thermal disruption of the crystalline network may destroy conduction pathways through the lower resistance crystalline phase and thereby lead to an increase in the electrical resistance of a phase change material in the reversible region. Melting, inducement of a high mobility state or thermal disruption of a crystalline network requires that sufficient energy remain at or near the site of heating to permit melting, inducement of a high mobility state or thermal disruption. Since thermal dissipation processes due to thermal conductivity, heat capacity, losses to the surroundings etc. act to remove energy and thus to inhibit melting, inducement of a high mobility state or thermal disruption of a crystalline network, the rate of energy addition must be sufficiently high to permit melting, inducement of a high mobility state or thermal disruption while compensating for thermal dissipation processes. Hence, the rate of energy or power is an important consideration in the reversible region of the electrical resistance curve.

Depending on the power and the state of the phase change material in the reversible region of FIG. 1, an increase or decrease in electrical resistance may occur and this increase or decrease is a reflection of an alteration of the crystalline network and/or abundance of crystalline regions in the phase change material. The reversible region is so named because the behavior of the phase change material in the reversible region is reversible. This reversibility is depicted by the two arrows shown in the reversible region of FIG. 1 and is believed by the instant inventors to reflect a reversible ability of applied power to vary the nature of the crystalline network in the phase change material. Structural states in the reversible region may be formed, converted into other states in the reversible region and reformed through the judicious application of power. A power and electrical resistance may be associated with each point in the reversible region. If the applied power exceeds the power associated with the point describing a particular structural state of the phase change material in the reversible region, the electrical resistance of the phase change material increases. Conversely, if the applied power is less than the power associated with the point representing the structural state of a phase change material in the reversible region, the electrical resistance decreases. It is believed by the instant inventors that increases in electrical resistance in the reversible region reflect an interruption or reconfiguration of the crystalline component of a phase change material in such a way that conductive pathways through the crystalline component are reduced in number, size or capacity without destroying contiguousness through at least a portion of the phase change material and vice versa for decreases in electrical resistance in the reversible region.

It is believed by the instant inventors that the increased electrical resistance is primarily due to increased formation of amorphous regions at the expense of crystalline regions and that the general tendency is for the fractional crystallinity of structural states to decrease with increasing separation from the set state in the reversible region. Upon application of sufficient power to drive the phase change material to the far right side of FIG. 1, the phase change material is restored to its' accumulation regime of behavior. It is believed by the instant inventors that restoration of the accumulation region occurs when the power provided to the phase change material is sufficient to destroy the contiguousness of the crystalline regions of the phase change material. The plot shown in FIG. 1 corresponds to one cycle of setting and resetting. The phase change material may be reproducibly set and reset over a large number of cycles. Conversions from the accumulation region to the reversible region of a phase change material are thus reversible over many cycles of operation.

U.S. Pat. Nos. 3,271,591; 3,530,441; 5,166,758; 5,296,716; 5,534,711; 5,536,947; 5,596,522; 5,825,046; 5,687,112; 5,912,839; and 6,141,241 incorporated by reference hereinabove thus teach an ability to control the fractional crystallinity and spatial arrangement of crystalline regions within phase change materials through the judicious application of energy in appropriate amounts and appropriate rates.

U.S. Pat. Nos. 4,653,024; 4,710,899; 4,737,934; 4,820,394; 5,128,099; 5,912,104; 5,935,672; 6,011,757 and U.S. patent application Ser. No. 10/026395 incorporated hereinabove by reference describe examples of structural states of phase change materials when used as optical recording media These references generally describe an ability to reversibly transform a phase change material between a substantially crystalline state and a substantially amorphous state using, for example, optical excitation sources having suitable wavelengths, intensities, powers, and lineshapes. In a typical optical recording application, data cells comprising a phase change material are used to store, write or erase data. The erased state is typically a substantially crystalline state and writing occurs by providing energy in an amount sufficient to create an amorphous mark within the volume of phase change material corresponding to a data cell. Through the judicious control of the rate, amount and spatial distribution of applied energy and the thermal budget, it is possible to precisely control the shape and volume of amorphous marks formed within a data cell. Consequently, the fractional crystallinity of the volume of phase change material associated with a data cell may be readily and continuously varied.

U.S. Pat. Nos. 4,653,024; 4,710,899; 4,737,934; 4,820,394; 5,128,099; 5,912,104; 5,935,672; 6,011,757 and U.S. patent application Ser. No. 10/026395 incorporated by reference hereinabove further indicate that the cycling lifetime between amorphous and crystalline phases of a phase change material may be extended by incorporating a phase change material within a stack of layers. In these stacks, a phase change material is embedded within a series of layers such as dielectric layers (e.g. $SiO_2$, ZnS, $Al_2O_3$, $GeO_2$, $TiO_2$), reflective or metallic layers (e.g. Al, Au, Ag, Pt, Cu, Ti) or protective layers (e.g. acrylates, polymers). While not wishing to be bound by theory, the instant inventors believe that neighboring layers may provide supplementary mechanical support that inhibits degradation of a phase change layer upon repeated cycling through its amorphous and crystalline phases.

Illustrative phase change materials suitable for use in accordance with the instant invention are those that include one or more of the elements In, Ag, Te, Se, Ge, Sb, Bi, Pb, Sn, As, S, Si, P, O and mixtures or alloys thereof, preferably in a eutectic composition. In a preferred embodiment, the phase change material includes a chalcogen element. In a most preferred embodiment, the phase change material includes Te as the chalcogen element. Also preferred are phase change materials that include a chalcogen in combination with Ge and/or Sb such as $Ge_2Sb_2Te_5$, $Ge_4SbTe_5$, $Sb_2Te_3$ and related materials. GeTe alone or in solid solution with CdTe constitutes another preferred embodiment. In another preferred embodiment, the phase change material includes Ag and/or In; especially in combination with Sb and/or Te. Eutectic compositions within the AgInSbTe family, such as AIST, are another most preferred embodiment. In another preferred embodiment, the phase change material includes a chalcogen and a transition metal such as Cr, Fe, Ni, Nb, Pd, Pt or mixtures and alloys thereof. Some examples of phase change materials suitable for use in accordance with the instant invention are provided in the U.S. Patents incorporated by reference hereinabove. Materials suitable in the context of the instant invention may also include a mixture of a dielectric material and a phase change material. Examples of such mixtures are described in commonly assigned U.S. Pat. No. 6,087,674, the disclosure of which is hereby incorporated by reference.

Figure 2:
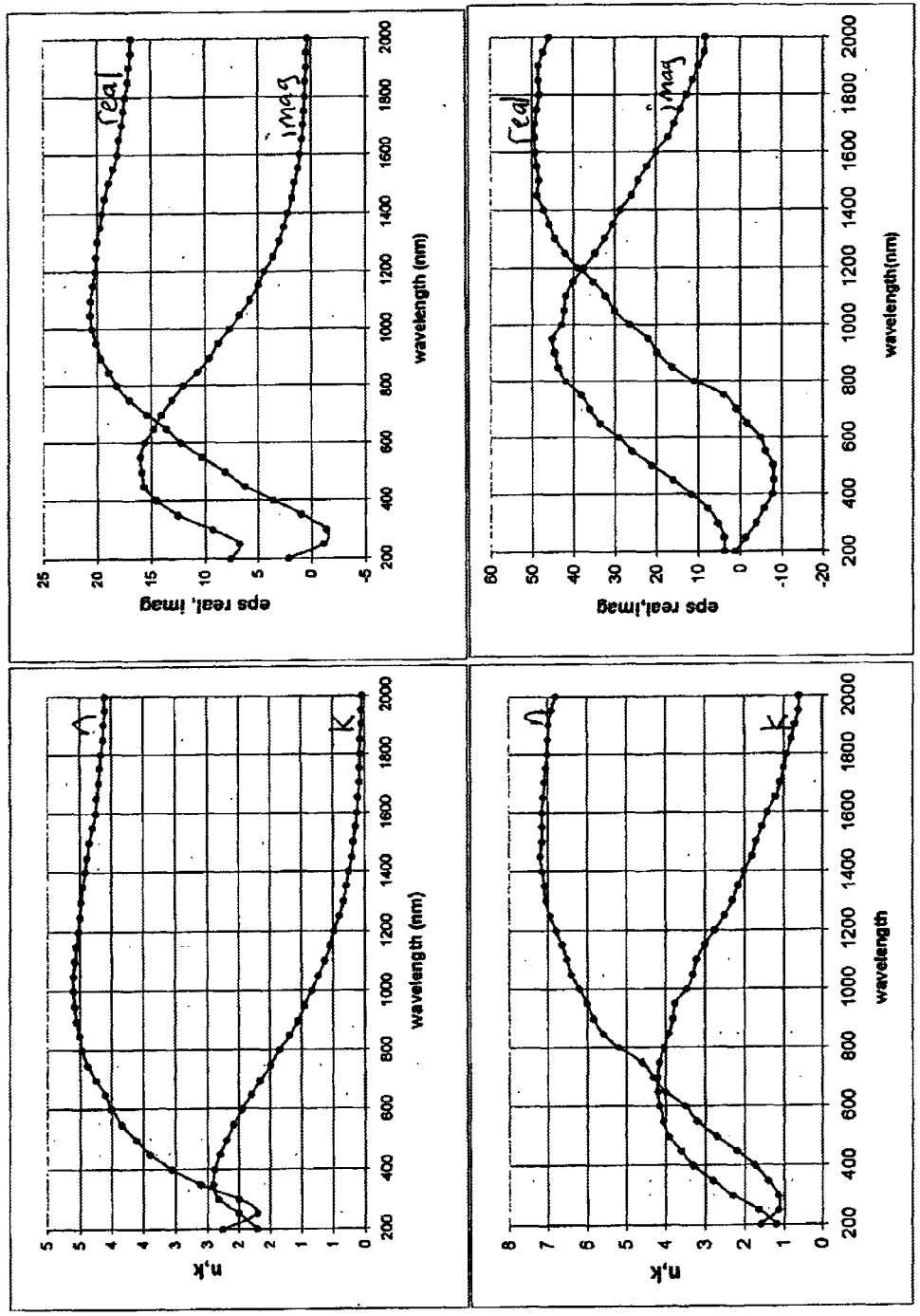
FIG. 2 Optical constants (n, k, eps (real and imaginary)) as a function of the wavelength of electromagnetic radiation for $Ge_2Sb_2Te_5$.

While not wishing to be bound by theory, the instant inventors believe that phase change materials that exhibit a change in bonding hybridization upon transformation from an amorphous phase to a crystalline phase are best suited for the instant invention. Participation of d-orbitals and transformation of d-orbitals from one hybridization scheme in one phase to a different hybridization scheme in another phase is especially believed to be beneficial in the context of the instant invention. The large changes in optical constants accompanying transformations of the instant phase change materials from an amorphous state to a crystalline state are believed to be due to changes in bonding configurations reflected by different hybridization schemes. Transformations among structural states are beneficial when utilized in the context of photonic crystals because the differences in fractional crystallinity and/or spatial distribution or connectivity of crystalline regions within a volume of phase change material lead to variability in the optical properties of phase change materials. FIG. 2 herein shows a comparison of the optical constants n (refractive index), k (extinction coefficient) and $\epsilon$ (permittivity (epsilon, abbreviated as eps)) of the phase change material $Ge_2Sb_2Te_5$ in polycrystalline and amorphous forms. Values of the optical constants are plotted as a function of the wavelength of electromagnetic radiation for frequencies in the ultraviolet, visible, and near infrared portions of the electromagnetic spectrum.

The refractive index variation shows that the contrast (expressed for example as a ratio) between the polycrystalline and amorphous phases is low at wavelengths near 700 nm and increases for longer and shorter wavelengths. The contrast is particularly high for wavelengths longer than 1000 nm or shorter than 600 nm and most particularly high for wavelengths longer than 1400 nm or shorter than 400 nm. The extinction coefficients of the amorphous and polycrystalline phases are similar at wavelengths shorter than 300 nm and deviate at longer wavelengths. The contrast in extinction coefficient is especially pronounced at wavelengths above about 1200 nm where the extinction coefficient of the amorphous phase is close to zero. Since the extinction coefficient is proportional to the absorption coefficient at a given wavelength of electromagnetic radiation, the data of FIG. 2 indicate that the polycrystalline phase of $Ge_2Sb_2Te_5$ is much more absorptive than the amorphous phase at wavelengths longer than about 400 nm. The data further indicate that the amorphous phase shows little or no absorption at wavelengths longer than about 1400 nm and is therefore highly transmissive at those wavelengths. The permittivity data show similar differences and are related to the refractive index and extinction coefficient data through the following equations:

$$\epsilon = \epsilon_{real} + i\epsilon_{imaginary}$$

$$\sqrt{\epsilon} = n + ik$$

$$\epsilon_{real} = n^2 - k^2$$

$$\epsilon_{imaginary} = 2nk$$

where the values of the optical constants correspond to values at a common frequency.

The variations of refractive index, absorption, permittivity and other optical properties accompanying transformations among structural states of phase change materials may be utilized to achieve tunability and switchability of photonic crystal performance. The data presented in FIG. 2 herein are representative of the variations and contrasts in optical constants between the amorphous and polycrystalline phases of a phase change material. Analogous variations occur in phase change materials having other chemical compositions. Partially crystalline phases have optical constants intermediate between those of the polycrystalline and amorphous phases. As a result, the collection of structural states of a phase change material provides a continuum of values of optical constants and contrasts thereof that are of relevance to the performance of photonic crystals. Controlled variations among structural states allow for controlled variations of the optical constants and hence to controlled performance of photonic crystals comprising phase change materials.

As described more fully hereinbelow, variations in refractive index resulting from transformations among structural states of a phase change material provide tunability in frequency selectivity of a photonic crystal resonator comprising a phase change material. In a preferred embodiment, the refractive indices of the amorphous and crystalline phases of a phase change material differ by at least 10% at one or more frequencies within the photonic band gap of the photonic crystal. In a more preferred embodiment, they differ by at least 25% at one or more frequencies within the photonic band gap of the photonic crystal. In a most preferred embodiment, they differ by at least 50% at one or more frequencies within the photonic band gap of the photonic crystal.

As described more fully hereinbelow, variations in extinction coefficient resulting from transformations among structural states of a phase change material provide modulation and switching effects to a photonic crystal resonator comprising a phase change material. In a preferred embodiment, the extinction coefficients of the amorphous and crystalline phases of a phase change material differ by at least 20% at one or more frequencies within the photonic band gap of the photonic crystal. In a more preferred embodiment, they differ by at least 50% at one or more frequencies within the photonic band gap of the photonic crystal. In a most preferred embodiment, they differ by at least 75% at one or more frequencies within the photonic band gap of the photonic crystal.

In embodiments in which the instant photonic crystals are used as electromagnetic frequency resonators, the instant invention provides for control of the internal losses of the resonator, as described more fully hereinbelow. In these applications, it may be preferable for the phase change material in the amorphous and crystalline states to differ with respect to the ratio of refractive index to extinction coefficient. In a preferred embodiment, the difference in the ratio of refractive index to extinction coefficient is at least 10% at one or more frequencies within the photonic band gap of the photonic crystal In a more preferred embodiment, this difference is at least 25% at one or more frequencies within the photonic band gap of the photonic crystal. In a most preferred embodiment, this difference is at least 50% at one or more frequencies within the photonic band gap of the photonic crystal.

Embodiments of the instant invention include photonic crystals that include phase change materials as well as tunable and switchable devices that include such photonic crystals. As indicated hereinabove, a photonic crystal includes a periodic arrangement of one or more units composed of a macroscopic dielectric material in a surrounding medium. Each macroscopic dielectric unit has a particular size, shape, refractive index, extinction coefficient, permittivity, chemical composition etc. and the assembly of a plurality of these units into a periodic arrangement provides a photonic crystal. Examples of macroscopic dielectric units include planes, rods, holes, and spheres. The units within a photonic crystal may be identical or combinations of units that differ with respect to one or more properties may be assembled or otherwise combined to form a photonic crystal. Photonic crystals having periodicity in one, two or three dimensions fall within the scope of the instant invention. Photonic crystals having defects also fall within the scope of the instant invention. Representative defects include one or more macroscopic dielectric units differing with respect to one or more properties relative to an otherwise uniform assembly of macroscopic dielectric units. The specific details associated with the arrangement, periodicity and properties of the macroscopic dielectric units govern properties such as the photonic band gap (width, shape and central frequency) and the existence of photonic states within the photonic band gap.

Representative examples are discussed below.

EXAMPLE 1

Figure 3:
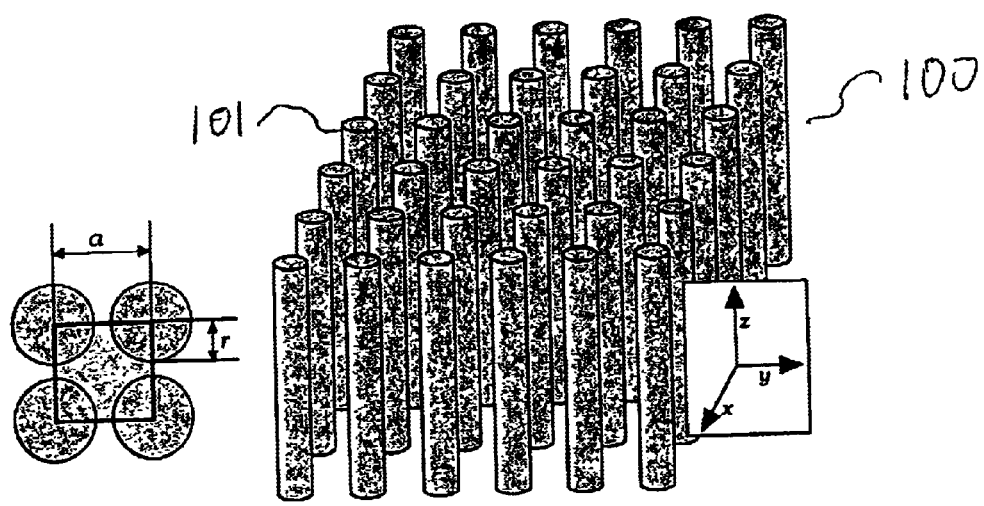
FIG. 3 Schematic depiction of a 6×6 two-dimensional photonic crystal.

In this example, a representative photonic crystal within the scope of the instant invention is described. FIG. 3 herein illustrates a two-dimensional photonic crystal. The crystal 100 includes a periodic arrangement of rods 101 composed of a macroscopic dielectric material disposed in a surrounding dielectric medium. In a preferred embodiment, the surrounding dielectric medium is $SiO_2$. Air and many other dielectric materials may also be used as a surrounding medium. The rods in this example have a radius r and a lattice spacing a as shown. The photonic crystal of this example possess a photonic band gap whose width and location in the electromagnetic spectrum may be varied in ways known in the art by varying factors such as r, a, the refractive index of the rods, and the extinction coefficient of the rods. The embodiment of FIG. 3 represents a 6×6 square lattice array of rods. An alternative depiction of the photonic crystal of FIG. 3 is presented in FIG. 4, which shows a plan view representation of the crystal.

Figure 5:
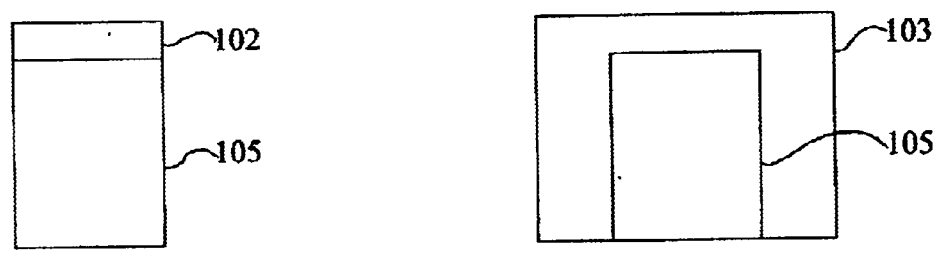
FIG. 5 Example embodiments of photonic crystal rods that include a phase change material.
Figure 5:
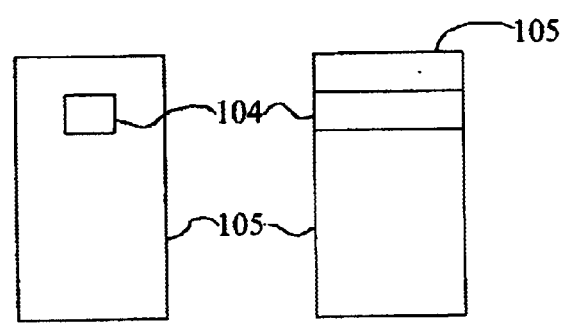

The rods in this example may be wholly or partly comprised of a phase change material in accordance with the instant invention. Rods partly including a phase change material may contain the phase change material as a capping layer 102, a coating layer 103, or internal layer 104 as shown in FIG. 5 herein. The remaining portion of the rod 105 may include one or more other dielectric materials that possess a sufficient refractive index contrast with air to provide photonic crystal effects.

An advantage of incorporating a phase change material into the photonic crystal of this example is that it permits dynamic tuning of the photonic band gap through variations of structural state. As described hereinabove, the application of energy induces transformations of a phase change material among its structural states where each structural state is characterized by a different combination of optical constants. Variations in refractive index across different structural states provide for tunability of the photonic band gap. For a given variation in refractive index due to a transformation among structural states, the extent of tunability varies with the relative proportion of phase change material included within a rod. The largest effects occur for rods wholly comprised of a phase change material with the magnitude of the effect decreasing as the volume fraction of phase change material in the rod decreases.

In a preferred embodiment of this example, the phase change material exhibits little or no absorption of wavelengths within the photonic band gap. In this preferred embodiment, the photonic crystal provides complete or nearly complete reflection of wavelengths within the photonic band gap for at least some polarizations (e.g. TE or TM) and angles of incidence of incident electromagnetic radiation and may be used as a reflection element with respect to these wavelengths. It may also be used as a an element for efficiently filtering out wavelengths within the photonic band gap from an arbitrary broadband input of electromagnetic radiation for at least some polarizations and angles of incidence.

Figure 4:
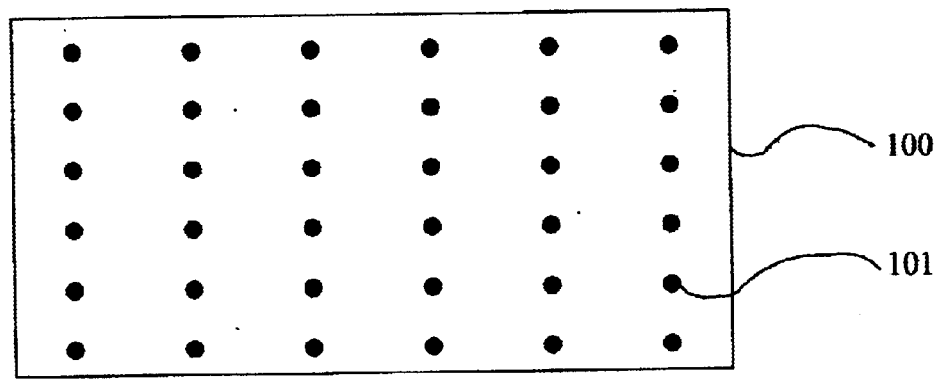
FIG. 4 Plan view depiction of the two-dimensional photonic crystal shown in FIG. 3.

Embodiments related to the example depicted in FIGS. 3 and 4 herein are also within the scope of the instant invention. Instead of an arrangement of rods in air, an arrangement of holes in a surrounding dielectric medium that includes a phase change material may also be formed. In this embodiment, the photonic band gap is determined by the hole diameter and spacing along with the refractive contrast with the surrounding dielectric medium. The surrounding dielectric medium may be wholly or partly comprised of a phase change material. Such a photonic crystal displays tunability through the application of energy to the surrounding dielectric medium in an amount and at a rate sufficient to induce a transformation in the structural state of the phase change material.

A further embodiment is one in which a phase change material is present in both the surrounding dielectric medium and the units of macroscopic dielectric medium assembled to form the photonic crystal. A phase change material that exists in different structural states in the surrounding medium and periodically arranged units of macroscopic dielectric medium provides a contrast in optical constants that may provide photonic crystal effects such as a photonic band gap. Rods including a phase change material in the crystalline phase, for example, may be assembled in a surrounding medium comprised of a phase change material in an amorphous phase.

The embodiment of FIGS. 3 and 4 depicts a square lattice arrangement of rods. Other arrangements such as triangular, hexagonal or rectangular are also within the scope of the instant invention. Periodic lattices having an arbitrary number of rods are also within the scope of the instant invention.

Rods or holes having non-circular cross-sections are also within the scope of the instant invention. The 6×6 embodiment including rods having a circular cross-section shown in FIGS. 3 and 4 is merely representative. Although rods having a circular cross-section are a preferred embodiment of the instant invention, rods having non-circular cross-sections also fall within the scope of the instant invention.

Scalability is a known feature of photonic crystals in the art. By varying the lattice spacing and rod size, photonic crystals having a photonic band gap over virtually any range of electromagnetic frequencies may be formed including microwave, infrared, and visible frequencies.

EXAMPLE 2

In this example, a defect is included in the embodiment of EXAMPLE 1. A 5×5 embodiment of a two-dimensional crystal is considered in this example. A defect may be created by altering one or more properties of one or more rods within a periodic arrangement of otherwise equivalent rods. A single rod may be enlarged, for example, as depicted in the plan view representation of FIG. 6 herein to create a defect 110. Similarly, a single rod may be reduced in diameter as depicted in the plan view representation FIG. 7 herein to create a defect 111. Defects may also be created by enlarging or reducing more than one rod or by enlarging some rods and reducing other rods. Other ways of introducing defects include wholly removing one or more rods, altering the shape of one or more rods relative to the surrounding rods, and introducing one or more rods comprised wholly or partly of a different material than surrounding rods. In the latter example, a different material provides different values of optical constants such as n and k and therefore constitutes a defect in the photonic crystal.

As indicated hereinabove, inclusion of one or more defects in a photonic crystal introduces one or more states in the photonic band gap. In the absence of defects, no photonic states exist within the photonic band gap at polarizations and angles of incidence included within the photonic band gap. When defects are introduced, they provide states within the photonic band gap and these states may be used to influence the propagation of light at electromagnetic frequencies defined by the one or more defects. The position of defect states within the photonic band gap determines the electromagnetic frequencies that may be influenced by the defect. In the absence of a defect, these frequencies are not be influenced by the photonic crystals. Defect states may be used, for example, to select, filter or otherwise influence specific frequencies of electromagnetic radiation within the range of frequencies included within the photonic band gap.

Figure 6:
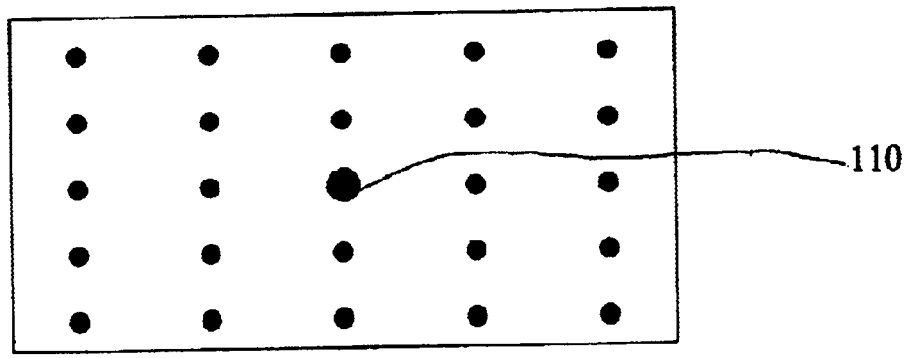
FIG. 6 Schematic depiction of a 5×5 two-dimensional photonic crystal having a defect.
Figure 7:
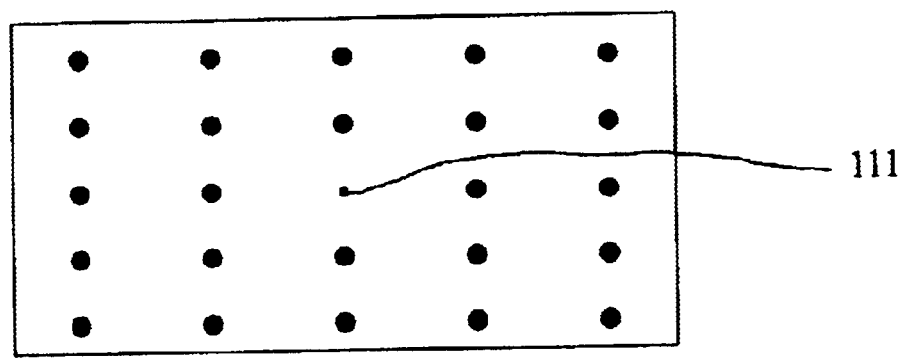
FIG. 7 Schematic depiction of a 5×5 two-dimensional photonic crystal having a defect.

The number and position of defect states introduced into the photonic band gap by photonic crystal defects depends on the nature of the defect. The magnitude of the size, shape or refractive index difference between a defect rod and the surrounding rods of a photonic crystal are among the factors that affect the positioning and/or number of defect states in the photonic band gap. In the embodiment of FIG. 6, for example, a slight increase in the diameter of a single rod with respect to the remaining rods in the photonic crystal introduces a doubly degenerate dipole defect state at a frequency slightly below the high frequency edge of the photonic band gap. Further increases in the defect rod diameter cause the defect state to move deeper in the photonic band gap (i.e. in the direction of lower electromagnetic frequencies) until it reaches the low frequency edge of the photonic band gap at which point the defect state is no longer in the photonic band gap. Still further increases in diameter, however, lead to the introduction of other defect states such as quadrupole, monopole, hexapole, and dodecapole states. In the embodiment of FIG. 7, a reduction of the diameter of a rod may introduce a monopole defect state into the photonic band gap. For small reductions in diameter, the defect state may not be localized in the photonic band gap. At some minimum diameter reduction relative to the surrounding rods, however, a monopole state appears in the photonic band gap at a frequency slightly higher than the low frequency edge of the photonic band gap. Further reductions in diameter cause the monopole state to move to higher frequencies within the photonic band gap. Variations in refractive index of a rod without changing its diameter introduces defect states similar to those described for defects differing in diameter from surrounding rods in a photonic crystal. Multiple defects (e.g. varying the diameter and/or refractive index of multiple rods) may introduce multiple states within the photonic band gap. Defects may similarly be formed through variations of one or more hole diameters within a surrounding dielectric slab.

In the embodiments of this example, a phase change material may be included in a defect rod or may wholly comprise a defect rod. Surrounding rods may include a phase change material or some other dielectric material. A photonic crystal having one or more defect rods comprised of a phase change material in a surrounding lattice of rods containing a dielectric material that is not a phase change material, for example, is within the scope of the instant invention. The inverse pattern in which one or more defect rods comprised of a dielectric material that is not a phase change material are included in a surrounding lattice of rods comprised in whole or in part of a phase change material is also within the scope of the instant invention.

Inclusion of a phase change material in a photonic crystal having a defect provides for tunability of the position or other properties of a defect state within the photonic band gap. Through variations in refractive index achieved through control of the structural state of a phase change material, the frequency of a defect state may be tuned. Since transformations among structural states of phase change materials are reversible as described hereinabove, reversible and dynamic tunability may be achieved with the instant invention.

EXAMPLE 3

In this example, a resonator system having little or no internal losses and comprising a photonic crystal according to the instant invention is provided. A resonator is a device that is capable of supporting electromagnetic radiation having one or more frequencies. Electromagnetic radiation having a particular frequency may be referred to as a channel. In order to support a channel, the frequency associated with the channel must be capable of propagating within the resonator and exciting resonant modes of the resonator as described hereinbelow. Preferred applications of resonators are those in which particular channels are selectively supported. Such resonators may provide a means for selectively removing supported channels of electromagnetic radiation from an input stream of electromagnetic radiation comprised of multiple channels. Resonators may similarly be used to selectively add supported channels to data streams. Supported channels of a resonator may also be herein referred to as resonant modes of the resonator.

Photonic crystals having defects are useful as resonators because the frequencies associated with defect states in the photonic band gap of a photonic crystal correspond to channels that may be supported by the resonator (i.e. resonant modes of the resonator). Since it is possible to control the position and properties of defect states in photonic crystals by varying, for example, the number, size, refractive index, permittivity etc. of defects as well as the geometry and refractive index of the surrounding medium, photonic crystals provide enormous flexibility for constructing resonators capable of supporting one or more channels of precisely defined frequencies over a wide range of frequencies. Inclusion of a phase change material within a photonic crystal affords tunability of the supported channel within a photonic crystal resonator whose geometry and optical properties are initially configured to support specific channels.

Figure 8:
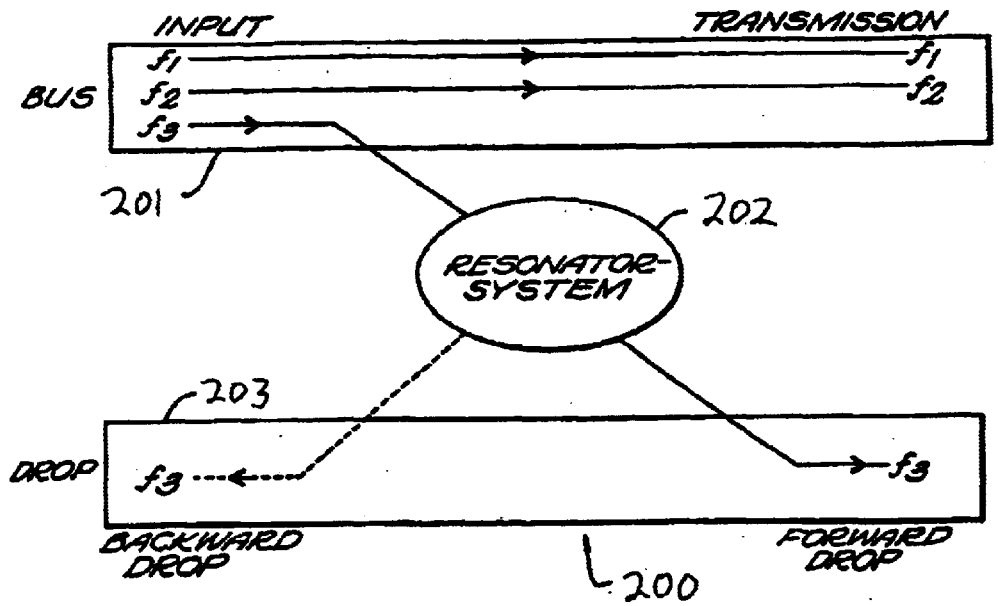
FIG. 8 Schematic depiction of a photonic device according to the instant invention.

A channel drop filter is a photonic device that represents one example of an application of a resonator. A schematic depiction of a channel drop filter is provided at 200 in FIG. 8 herein. The channel drop filter includes a resonator system 202 coupled evanescently to a bus waveguide 201 and drop waveguide 203. In the channel drop filter of FIG. 8, an input stream of electromagnetic radiation comprised of one or more channels, each of which represents a specific frequency, is introduced or otherwise confined in a bus waveguide 201. In the example of FIG. 8 herein, three input channels having frequencies $f_1$, $f_2$, and $f_3$ are shown. The evanescent fields of the propagating input channels overlap the resonator. The evanescent fields of channels supported by the resonator provide a mechanism for transferring supported channels to the resonator. Any transferred amplitude may be viewed as an excitation of the resonant modes of the resonator (i.e. excitation of the resonator at the supported resonant frequencies) and results in a commensurate decrease in the amplitude of the resonant frequencies in the input data stream propagating in the bus waveguide. Once introduced to the resonator, the resonant frequencies continue to interact with the bus waveguide and may further interact with the drop waveguide through evanescent fields. These interactions lead to a decay of the amplitude of the resonant modes into one or both of the bus and drop waveguides.

Figure 9:
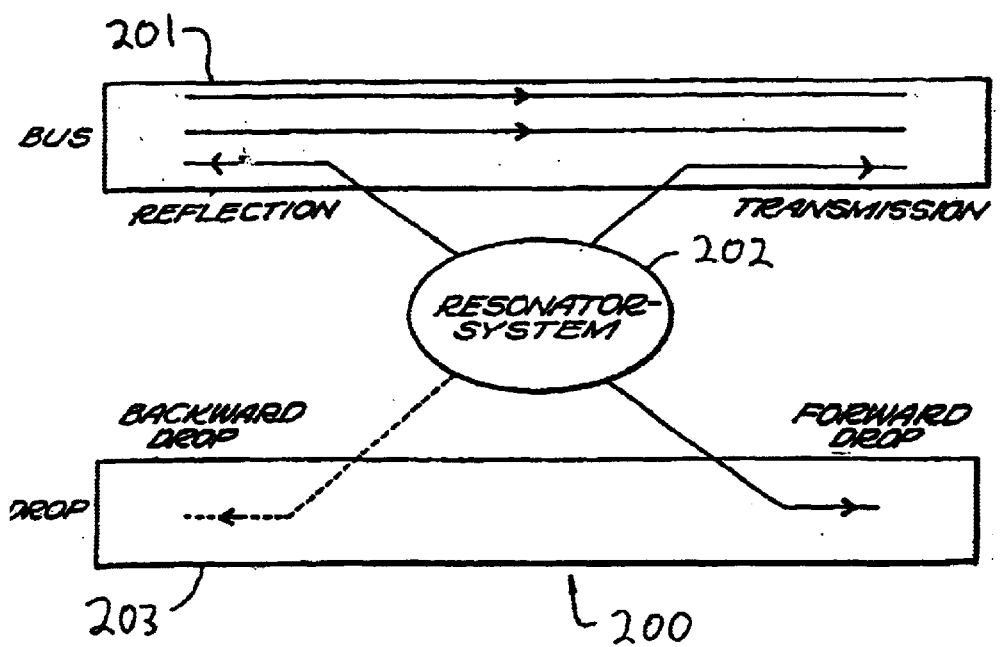
FIG. 9 Schematic depiction of the decay pathways from the resonator for the photonic device shown in FIG. 8.

The decay of the resonant modes determines the ultimate response of the channel drop filter to the input stream of electromagnetic radiation. Four decay processes may occur for resonant modes. Two decay processes are possible for each of the bus and drop waveguides: decay leading to the propagation of the resonant frequency in the direction of the input data stream and decay leading to the propagation of the resonant frequency in the direction opposite the direction of propagation of the input data stream. Decay of a resonant mode back to the bus waveguide in the direction opposite to that of the input data stream is hereinafter referred to as reflection. Decay of a resonant mode back to the bus waveguide in the direction of the input data stream is hereinafter referred to as transmission. Decay of a resonant mode to the drop waveguide in the direction opposite that of the input data stream is hereinafter referred to as backward drop. Decay of a resonant mode to the drop waveguide in the direction of the input data stream is hereinafter referred to as forward drop. The various decay pathways from the resonator are included in FIG. 9 herein.

In a channel drop filter, it is preferable to transfer a resonant frequency from the bus waveguide to the drop waveguide to the fullest possible extent. Complete transfer requires elimination of the reflection decay pathway from the resonator and prevention of the transmission of the resonant frequency in the bus waveguide. In order to achieve zero reflection and zero transmission, specific symmetry requirements must be satisfied by the configuration of the system components of the channel drop filter; namely, the bus waveguide, the resonator and the drop waveguide. Most importantly, the system configuration must possess mirror plane symmetry in the direction normal to the propagation of light in the waveguides. The presence of mirror plane symmetry provides a parity with respect to electromagnetic field intensity to the resonant modes of the resonator. Electromagnetic field intensity may be positive or negative and a resonant mode may have regions of positive intensity, negative intensity or both positive and negative intensity within the resonator. Parity of intensity refers to symmetry of the spatial intensity distribution with respect to the mirror plane. An odd parity mode has regions of positive intensity symmetrically disposed about the mirror plane with respect to regions of negative intensity, while an even parity mode has regions of positive (negative) intensity symmetrically disposed about the mirror plane with respect to regions of positive (negative) intensity. An even parity mode need not consist exclusively of regions of either positive or negative intensity, but when regions of both positive and negative intensity occur, each positive region is symmetrically disposed about the mirror plane with respect to another positive region and each negative region is symmetrically disposed with respect to another negative region.

The presence of even and odd parity resonant modes is necessary to achieve zero reflection and zero transmission because under suitable conditions, even and odd parity modes may destructively interfere with each other (in the case of reflection) or with an input channel (in the case of transmission) to preclude reflection and transmission of a resonant frequency. An arbitrary input channel may be described by a propagation function exp(ikx) where k is the wavevector describing the propagation and x describes the direction of propagation. The propagation function may be equivalently expressed in terms of its even and odd parity components according to: $\exp(ikx)=\cos(kx)+i\sin(kx)$. Since cos(kx) is an even parity function, it couples only with (i.e. is only able to excite) resonant modes having even parity. Similarly, since sin(kx) is an odd function, it couples only with resonant modes having odd parity. If the even and odd parity components of the propagation function couple with equal strength to the resonator, the even and odd parity resonant modes are excited to equal extents within the resonator and decay of the resonator entails decay of even and odd parity resonant modes having equal amplitudes. Provided that the frequencies of the even and odd parity resonant modes are substantially the same and that the decay rates of the even and odd parity resonant modes are substantially the same, no net reflection occurs because the decaying even and odd parity components interfere destructively and cancel. The decay rate of a resonant mode is a measure of the rate at which mode intensity departs the resonator. The Q (quality) factor is commonly used to quantify decay of resonant modes from a resonator.

In addition to a contribution from decaying resonant modes, the transmission component may further include a contribution from imperfect coupling of the resonant frequency with the resonator. Even if the even and odd parity components of the resonant input channel couple equally with a resonator, it is not necessarily the case that complete transfer of all intensity to the resonator occurs. Any non-transferred intensity continues to propagate along the bus waveguide. In order to prevent transmission of the resonant input channel, it is necessary to cancel any propagating non-transferred intensity. This cancellation occurs through the superposition, in the direction of transmission, of the contribution of the decaying resonant modes with the contribution of the non-transferred intensity.

Figure 10:
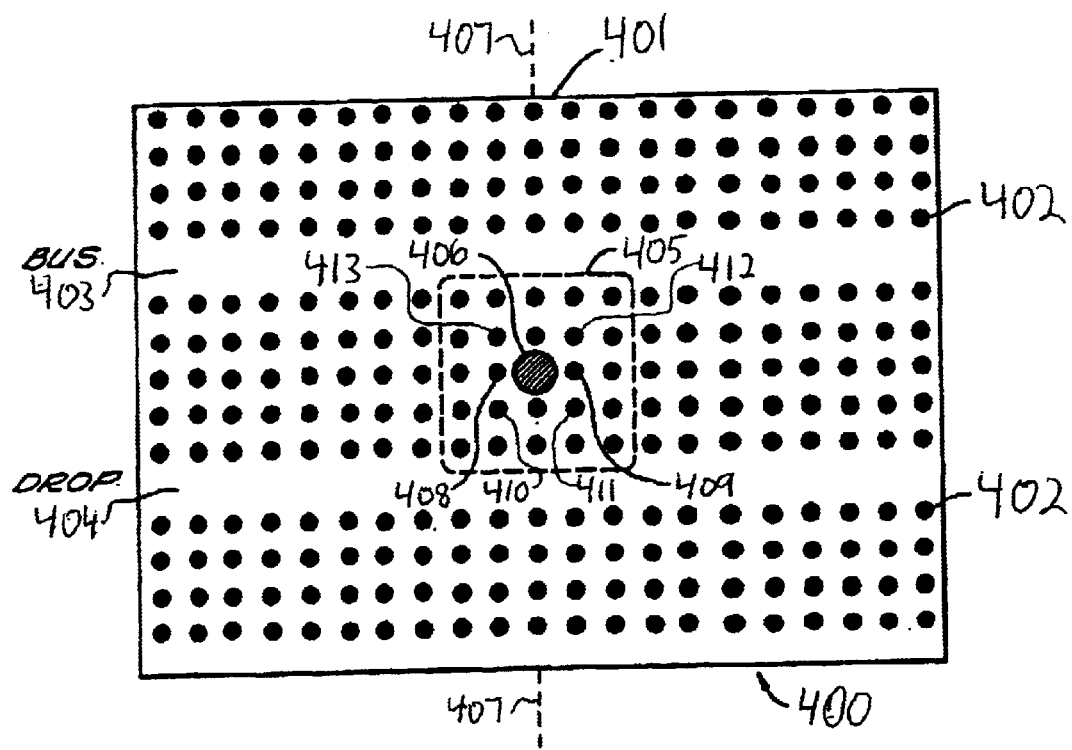
FIG. 10 Plan view of a photonic device according to the instant invention.

As is evident from the foregoing discussion, the presence of a mirror plane of symmetry in the direction orthogonal to the direction of propagation of the input stream is an important consideration in configuring a channel drop filter from a bus waveguide, resonator and drop waveguide combination. Parallel alignment of the bus and drop waveguides provides the required mirror plane symmetry with respect to those two components. In order for the overall system to possess mirror plane symmetry, it is necessary for the resonator system to possess the required mirror plane symmetry internally. Since supported channels correspond to photonic states in the photonic band gap of the instant photonic crystals and since defects are the origin of these photonic states, it follows that the arrangement or positioning of the defects within the lattice of the photonic crystal be symmetrical with respect to a central mirror plane. FIG. 10 herein provides an example of a channel drop filter in plan view according to the instant invention. The channel drop filter 400 includes a photonic crystal 401 comprised of a periodic assembly of rods 402. A bus waveguide 403 and drop waveguide 404 are formed in the photonic crystal by removing rows of rods. A resonator 405 is coupled to both the bus and drop waveguides and includes a defect 406 formed by enlarging the central rod of the resonator. The resonator is analogous to that described in EXAMPLE 2 and FIG. 6 hereinabove and is symmetrically disposed with respect to a central plane of symmetry, schematically depicted as 407 in FIG. 10 herein. Since the resonator includes a single defect, the defect necessarily must reside on the mirror plane in order to maintain mirror symmetry for the overall channel drop filter. The enlarged rod represents a defect that is capable of supporting two degenerate modes and since mirror plane symmetry is present, these modes have even and odd parity. In operation, one or more channels of electromagnetic radiation are introduced as an input data stream to the bus waveguide. Channels at the resonant frequency defined by the defect 406 couple to the resonator thereby exciting resonant modes having even and odd parity. The resonator modes subsequently decay and transfer intensity to the drop waveguide. In the embodiment of FIG. 10, transfer occurs in the backward drop direction. In a preferred embodiment, the transfer occurs without reflection or transmission of the resonant frequency. As discussed hereinabove, perfectly efficient transfer requires that the even and odd parity resonant modes have substantially the same frequency and dissipate at substantially the same rate. The presence of the waveguides and possible differences in how strongly each waveguide couples to the resonator act to remove the degeneracy of the even and odd parity modes and to alter the relative coupling strength of the even and odd parity modes to the waveguides. These effects in turn act to impede the transfer efficiency.

Effects leading to a breaking of degeneracy and unequal decay rates for the even and odd parity modes may be countered through adjustments in the photonic crystal lattice away from the defect. Variations in selected lattice rods provide a means for fine tuning the performance of the resonator with respect to even and odd parity modes. Variations in rod shape, diameter or optical constants allow for adjustment of the relative frequencies and decay rates of the even and odd parity modes. Such variations may be viewed as perturbations on the principle defect 406 to form an enlarged defect with resonant mode frequencies and decay rates established in zeroth order by the defect 406 with first order perturbations imposed thereon to predictably fine tune the frequency and/or decay rate of the even and/or odd parity resonant modes.

The principle requirement in effecting perturbations is preservation of mirror plane symmetry. An example of a perturbation consistent with the symmetry requirement is one in which rods 408 and 409 in FIG. 10 herein are increased to a common diameter intermediate between the diameters of the regular lattice rods 402 and the defect lattice rod 406. Rod 406 may be viewed as the principle contribution to the overall defect structure, while perturbed rods 408 and 409 may be viewed as secondary contributions to the overall defect structure. The perturbations provide an extended defect structure that maintains mirror plane symmetry and that has frequencies and decay rates of even and odd parity resonant modes determined primarily by the principle defect 406 with perturbations provided through secondary defects 408 and 409. Judicious variation in the diameters of secondary defects 408 and 409 provide a continuous adjustment capability with respect to frequencies and decay rates thereby permitting optimization of the overall transfer efficiency of selected electromagnetic frequencies from the bus waveguide to the drop waveguide via the resonator. A similar capability is afforded by other symmetric perturbations of lattice rods surrounding the principle defect 406. A uniform perturbation of the diameter or optical constants of lattice rods 410, 411, 412, and 413, for example, represents another mechanism for fine tuning the performance of the resonator of FIG. 10 herein. The magnitude and direction of variations in the frequencies and/or decay rates of even and/or odd parity resonant modes is determined by the extent of the perturbation provided to the secondary defect rods. Calculations using conventional electromagnetic equations may be used to guide the nature of perturbations required to achieve specific changes in the frequency and/or decay rate of even and odd parity resonant modes.

Figure 11:
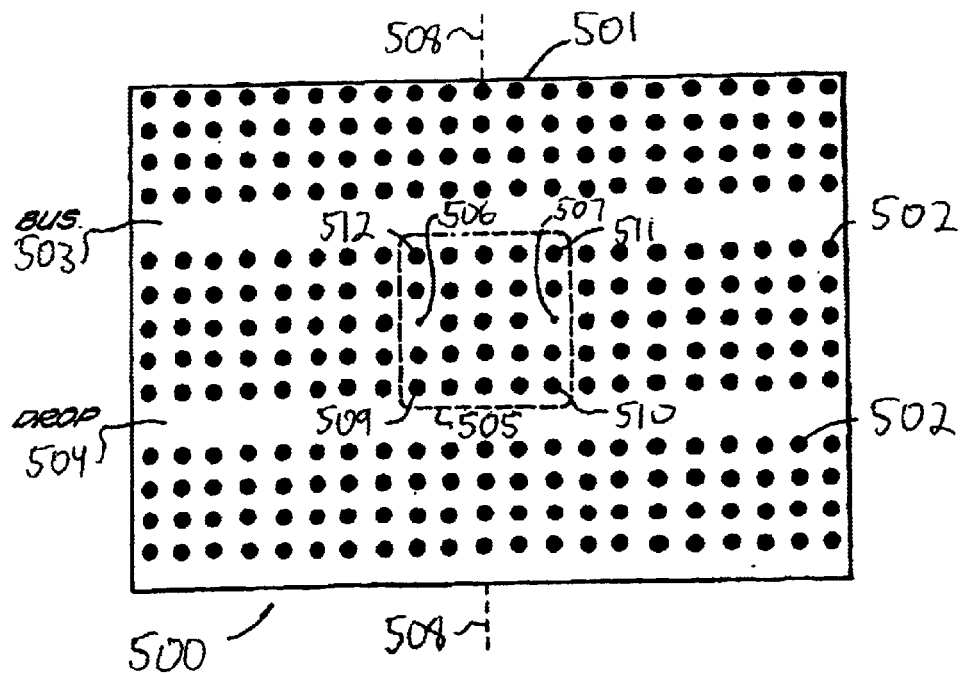
FIG. 11 Plan view of a photonic device according to the instant invention.

The embodiment of FIG. 10 herein represents an example of a single defect capable of supporting even and odd parity resonant modes. Resonators capable of supporting even and odd parity modes may also be achieved by including two or more defects within a photonic crystal. As discussed in EXAMPLE 2 hereinabove, for example, reduction in the diameter of a rod relative to surrounding rods in a two-dimensional photonic crystal creates a monopolar defect capable of supporting a single resonant mode. By including two monopolar defects that are symmetrically disposed about the central mirror plane of the channel drop filter, as in FIG. 11 herein, it is possible to stabilize two resonant modes of opposite parity in the resonator. FIG. 11 shows a channel drop filter 500 includes a photonic crystal 501 comprised of a periodic assembly of rods 502. A bus waveguide 503 and drop waveguide 504 are formed in the photonic crystal by removing rows of rods. A resonator 505 is coupled to both the bus and drop waveguides and includes defect 506 and 507 formed by reducing the diameter of two of the lattice rods by equal amounts. Each defect of the resonator is analogous to the defect described in EXAMPLE 2 and FIG. 7 hereinabove and the combination of defects is symmetrically disposed with respect to a central plane of symmetry, schematically depicted as 508, in order to preserve overall mirror symmetry for the resonator. The presence of mirror plane symmetry means that the resonator supports resonant modes having even and odd parity. In isolation, each of the defects 506 and 507 supports a singly degenerate mode. The even and odd parity resonant modes of the resonator are obtained through even and odd parity linear combinations of the two singly degenerate modes of the two defects in this embodiment.

In operation, the resonator 505 couples to both the bus waveguide 503 and drop waveguide 504 to effect a transfer of electromagnetic frequencies corresponding to the resonant frequencies of the resonator, which in turn are defined by the position and size of defects 506 and 507. In the embodiment of FIG. 11, transfer occurs in the forward drop direction. As discussed hereinabove, perfectly efficient transfer requires that the even and odd parity resonant modes have substantially the same frequency and dissipate at substantially the same rate. Field intensity localized at one defect influences field intensity at the other defect and further interactions occur with field intensity in the waveguides. The interactions of the defects with each other and with the waveguides influence resonant modes of even and odd parity to different extents thereby leading to a breakdown in degeneracy and different decay rates for the even and odd parity resonant modes. These effects act to impede the transfer efficiency, but can be ameliorated through secondary adjustments of selected rods in the vicinity of the defects 506 and 507 in the resonator. As in the embodiment of FIG. 10 herein, perturbations in the size, shape or optical constants of one or more neighboring rods in such as way as to maintain mirror symmetry provide a mechanism for fine tuning the frequencies and decay rates of the even and odd parity resonant modes. Uniform perturbation of rods 509, 510, 511, and 512, for example, permit fine tuning of the performance of the resonator.

According to the instant invention, fine tuning of a photonic crystal resonator that includes a phase change material may be accomplished by varying the optical constants of the phase change material through transformations among its structural states. As described hereinabove, judicious application of energy to a phase change material permits controlled variation of optical constants such as refractive index and extinction coefficient thereby providing a fine tuning capability of a resonator in a channel drop filter. Fine tuning via structural transformations in a phase change material may be achieved for phase change material present in: principle or secondary defect rods, neighboring rods that provide perturbative effects to defect rods, or surrounding lattice rods. The continuous transformations possible among the structural states of a phase change material provide a continuous tuning capability and therefore enable precise fine tuning of a resonator. Selectively induced structural transformations in symmetrically disposed rods containing a phase change material preserve the mirror symmetry of the resonator.

The channel drop filters of this example permit the transfer of resonant electromagnetic frequencies from one waveguide to another waveguide. Accordingly, the channel drop filters are useful for extracting selected frequencies of electromagnetic radiation from a broadband input stream. It should be equally appreciated that the embodiments of this example may be used to add electromagnetic radiation at a resonant frequency to a propagating data stream. If, for example, a data stream is propagating in the drop waveguide, any channel transferred from the bus waveguide would be added to the data stream.

By controlling the size, shape, and optical constants of one or more defects relative to the surrounding lattice in a photonic crystal, it is possible to obtain photonic band gap states and resonant frequencies that correspond to electromagnetic frequencies over a wide range. Resonant frequencies in the microwave, infrared and visible, for example, are achievable through the appropriate scaling of defects relative to the remaining portion of the photonic crystal lattice. Resonant frequencies in the telecommunications windows (e.g. 1300–1600 nm) are especially important for many applications and are achievable with the instant invention.

It is to be further appreciated that the waveguide portion of the channel drop filters of this example need not be composed of a photonic crystal. Conventional waveguides such as channel waveguides, fiber waveguides, waveguides that function through total internal reflections, etc. may be used in combination with the phase change material containing photonic crystal resonators described hereinabove.

EXAMPLE 4

In this example, modulation and switching effects are described for the photonic device of EXAMPLE 3. Switching is accomplished by selectively enabling or disabling a transfer of electromagnetic radiation from one waveguide to another waveguide. Switching is an ON/OFF process in which electromagnetic radiation at a resonant frequency is allowed or not allowed to transfer by controlling some characteristic of the resonator. In the ON state, the resonator permits transfer of a resonant frequency and in the OFF state, the resonator does not permit transfer of a resonant frequency. Modulation is an attenuation effect in which the degree or efficiency of transfer is influenced in a deliberate manner.

Switching and modulation effects are related to the interaction of resonant electromagnetic frequencies with the material comprising the resonator. In order to achieve efficient transfer of electromagnetic radiation, it is necessary for substantially all of the resonant electromagnetic radiation to decay to the drop waveguide. In the discussion of EXAMPLE 3 hereinabove, it was indicated that efficient transfer requires that even and odd parity resonant modes have essentially the same frequency and decay rate. These conditions suffice provided that the resonant frequencies are able to excite the resonator modes as described hereinabove. Excitation of resonator modes is possible provided that the resonator exhibits little or no internal losses as in EXAMPLE 3 hereinabove. Significant internal losses, however, spoil the resonance interaction between the resonator and waveguides and preclude transfer of electromagnetic radiation at the resonant frequency from one waveguide to another either wholly (switching effect) or partly (modulation effect).

A resonator exhibiting internal losses may be referred to as a lossy resonator. In order to achieve perfectly efficient transfer of electromagnetic radiation, a resonator must be non-lossy. In a non-lossy resonator, electromagnetic radiation at the resonant frequency is capable of exciting resonant modes of the resonator as described hereinabove. Excitation of resonant modes coincides with an establishment of high field amplitudes at the resonant frequency within the resonator. In a lossy resonator, resonance is spoiled and excitation of resonant modes does not occur. As a result, it is not possible to establish high field amplitudes in the resonator and consequently, decaying amplitudes from the resonator are eliminated. From a functional viewpoint, the reflection, transmission, backward drop and forward drop decay pathways described hereinabove are no longer relevant and electromagnetic radiation propagating at a resonant frequency through the bus waveguide continues essentially unaffected by the resonator. In the high loss limit, therefore, the function of the resonator is disabled and transmission of electromagnetic radiation in the bus waveguide occurs substantially unimpeded by the resonator. In the low or no loss limit, the resonator is fully functional and optimal transfer of electromagnetic radiation at a resonant frequency occurs. At intermediate lossiness, partial transfer of electromagnetic radiation at the resonant frequency occurs.

Tunable control of the lossiness of a resonator provides the basis for switching and modulation effects. Switching occurs upon reversible variation of a resonator between its high loss state and its low or no loss state. Modulation occurs upon reversible variation of a resonator among states having a substantially continuous range of lossiness. Modulation typically involves variation of a resonator between its low or no loss state and one or more states having intermediate lossiness or variation of a resonator between its high loss state and one or more states having intermediate lossiness. Variations among states having differing degrees of lossiness in the intermediate lossiness regime may also be used to provide a modulation effect.

In the instant invention, the lossiness of a resonator may be tuned by varying the absorption of a phase change material through control of its structural state. Absorption represents one mechanism of internal loss for a resonator. A resonator that exhibits strong absorption (i.e. high absorption coefficient) of a resonant frequency experiences high losses with respect to that frequency. A resonator that exhibits low or no absorption (i.e. zero or low absorption coefficient) of a resonant frequency experiences low or no losses with respect to that frequency. The absorption coefficient of a material is proportional to the extinction coefficient. As described hereinabove, the extinction coefficient of a phase change material is different for different structural states. By inducing transformations of a phase change material among structural states having different extinction coefficients, tunable variations in the lossiness of a resonator may be achieved. Switching and modulation are thereby enabled.

As an example, the phase change material $Ge_2Sb_2Te_5$ may be considered. FIG. 2 herein presents a plot of the extinction coefficient of $Ge_2Sb_2Te_5$ as a function of the wavelength of electromagnetic radiation. At longer wavelengths, the extinction coefficient of the amorphous phase is very low, while the extinction coefficient of the crystalline phase is still appreciable. The lossiness at these longer wavelengths of a resonator comprising $Ge_2Sb_2Te_5$ in the amorphous state is therefore much lower than the lossiness of a resonator comprising $Ge_2Sb_2Te_5$ in the crystalline state. The differential in lossiness depends on the relative amount of phase change material present in the resonator. As the abundance of phase change material in the resonator increases, the differential resonator lossiness increases upon a structural transformation among the amorphous and crystalline phases of the phase change material. The large difference in extinction coefficient for the crystalline and amorphous phases of $Ge_2Sb_2Te_5$ at the longer wavelengths depicted in FIG. 2 provides a switching effect upon reversible transformation between those phases. A resonator configured so that $Ge_2Sb_2Te_5$ is in the amorphous state represents a no or low loss resonator with an ability to efficiently transfer electromagnetic radiation and corresponds to an ON state of the resonator. A resonator configured so that $Ge_2Sb_2Te_5$ is in the crystalline state represents a high loss resonator in which resonance is spoiled thereby precluding or inhibiting transfer of electromagnetic radiation. Such a resonator corresponds to an OFF state of the resonator. The ability to reversible transform a phase change material between its amorphous and crystalline states by providing energy thus provides a basis for switching.

A modulation effect may be achieved upon reversible transformation between structural states having similar extinction coefficients. In the example of $Ge_2Sb_2Te_5$, the amorphous state is preferably selected as the ON state for a resonator designed to function at the longer wavelengths indicated in FIG. 2 herein. Transformation of $Ge_2Sb_2Te_5$ to its crystalline state converts the resonator to its OFF state to achieve switching as described hereinabove. Transformation of $Ge_2Sb_2Te_5$ to a partially crystalline state, however, provides a resonator with an extinction coefficient greater than that of the amorphous phase, but less than that of the crystalline phase. The lossiness of the resonator is thereby increased relative to the ON state, but may not be increased sufficiently to provide a switching effect Instead, transfer of electromagnetic radiation at the resonant frequency may be partially, rather than wholly, eliminated. A modulation effect is thereby achieved.

In resonator embodiments in which the photonic crystal is only partially composed of a phase change material, modulation rather than switching may also occur. In such photonic crystals, the non-phase change material portion may dominate the overall extinction coefficient of the photonic crystal and the phase change material portion may only provide a secondary influence. As a result, a substantial change in the extinction coefficient of the phase change material upon transformation to a highly absorptive structural state may be insufficient to effect switching, but sufficient to effect modulation. The magnitude of the absorption coefficient of the phase change material in its highly absorptive state and the relative abundance of the phase change material in the resonator dictate whether switching or modulation occur.

Although the foregoing discussion has included $Ge_2Sb_2Te_5$ as a representative phase change material within a resonator, it will be appreciated that corresponding properties are achievable from all phase change materials within the scope of the instant invention. Different phase change materials exhibit different variations of extinction coefficient (and refractive index) with the frequency of electromagnetic radiation and provide switching and modulation capabilities over different portions of the electromagnetic spectrum. The principles of switching and modulation set forth hereinabove apply to all resonator embodiments within the scope of the instant invention. Resonators having a single defect, two defects or a plurality of defects, including secondary defects, are examples of resonators that fall within the scope of the instant invention. In resonators including two or more defects capable of localizing two or more resonant modes, switching and modulation may be effected with respect to some or all defects to provide further variability in the control of the efficiency or frequency of transferred electromagnetic radiation or the dominant decay pathway (reflection, transmission, backward drop, forward drop). Control of the dominant decay pathway provides flexibility in the directional routing of electromagnetic radiation. Narrow band reflectors, for example, are achievable within the scope of the instant invention through optimization of the reflection decay pathway relative to the transmission, backward drop and forward drop decay pathways.

The disclosure and discussion set forth herein is illustrative and not intended to limit the practice of the instant invention. Numerous equivalents and foreseeable variations thereof are envisioned to be within the scope of the instant invention. It is the following claims, including all equivalents, in combination with the foregoing disclosure, which define the scope of the instant invention.

We claim:

1. A photonic crystal including units of a macroscopic dielectric medium periodically arranged within a surrounding dielectric medium, said photonic crystal comprising a phase change material, said phase change material having a plurality of structural states, said structural states including an amorphous state and a crystalline state, said phase change material being reversibly transformable among said structural states upon the providing of energy.

2. The photonic crystal of claim 1, wherein said units of macroscopic dielectric medium comprise said phase change material.

3. The photonic crystal of claim 1, wherein at least two of said plurality of structural states are present in said photonic crystal.

4. The photonic crystal of claim 1, wherein the refractive index of said amorphous state and said crystalline state differ by at least 10% at one or more frequencies within the photonic band gap of said photonic crystal.

5. The photonic crystal of claim 1, wherein the refractive index of said amorphous state and said crystalline state differ by at least 25% at one or more frequencies within the photonic band gap of said photonic crystal.

6. The photonic crystal of claim 1, wherein the refractive index of said amorphous state and said crystalline state differ by at least 50% at one or more frequencies within the photonic band gap of said photonic crystal.

7. The photonic crystal of claim 1, wherein the extinction coefficient of said amorphous state and said crystalline state differ by at least 20% at one or more frequencies within the photonic band gap of said photonic crystal.

8. The photonic crystal of claim 1, wherein the extinction coefficient of said amorphous state and said crystalline state differ by at least 50% at one or more frequencies within the photonic band gap of said photonic crystal.

9. The photonic crystal of claim 1, wherein the extinction coefficient of said amorphous state and said crystalline state differ by at least 75% at one or more frequencies within the photonic band gap of said photonic crystal.

10. The photonic crystal of claim 1, wherein the ratio of the refractive index to the extinction coefficient of said amorphous state and said crystalline state differ by at least 10% at one or more frequencies within the photonic band gap of said photonic crystal.

11. The photonic crystal of claim 1, wherein the ratio of the refractive index to the extinction coefficient of said amorphous state and said crystalline state differ by at least 25% at one or more frequencies within the photonic band gap of said photonic crystal.

12. The photonic crystal of claim 1, wherein the ratio of the refractive index to the extinction coefficient of said amorphous state and said crystalline state differ by at least 50% at one or more frequencies within the photonic band gap of said photonic crystal.

13. The photonic crystal of claim 1, wherein said plurality of structural states further includes one or more partially crystalline states, said partially crystalline states including amorphous phase regions and crystalline phase regions.

14. The photonic crystal of claim 1, wherein said phase change material comprises an element selected from the group consisting of In, Ag, Te, Se, Ge, Sb, Bi, Pb, Sn, As, S, Si, P, O and mixtures and alloys thereof.

15. The photonic crystal of claim 14, wherein said phase change material further comprises a transition metal element.

16. The photonic crystal of claim 1, wherein said phase change material comprises a chalcogen.

17. The photonic crystal of claim 16, wherein said chalcogen is Te.

18. The photonic crystal of claim 17, wherein said phase change material further comprises Ge, Sb or Cd.

19. The photonic crystal of claim 1, wherein said phase change material has a eutectic composition.

20. The photonic crystal of claim 1, wherein said phase change material comprises Ag and In.

21. The photonic crystal of claim 20, wherein said phase change material further comprises Sb or Te.

22. The photonic crystal of claim 1, wherein said photonic crystal further comprises $SiO_2$.

23. The photonic crystal of claim 22, wherein said surrounding dielectric medium comprises $SiO_2$.

24. The photonic crystal of claim 1, wherein said units of macroscopic dielectric medium are comprised of air.

25. The photonic crystal of claim 1, wherein said energy is provided in the form of optical energy.

26. The photonic crystal of claim 1, wherein said energy is provided in the form of electrical energy.

27. The photonic crystal of claim 1, wherein said units of macroscopic dielectric medium are substantially uniform with respect to size, shape, and optical constants.

28. The photonic crystal of claim 27, wherein one or more of said uniform units is modified to form one or more defect units, wherein said defect units differ in size, shape, or optical constants from said uniform units.

29. The photonic crystal of claim 28, wherein said one or more defect units provides one or more photonic states in the photonic band gap of said photonic crystal.

30. A photonic device comprising:
a bus waveguide;
a resonator comprising the photonic crystal of claim 29, said resonator having one or more resonant modes, said resonant modes having resonant frequencies, said resonant frequencies being determined by said one or more defect photonic states; and
a drop waveguide parallel to said bus waveguide;
wherein said resonator is coupled to said bus waveguide and said drop waveguide.

31. The photonic device of claim 30, wherein said resonator is symmetrically disposed about a plane normal to the bus waveguide.

32. The photonic device of claim 30, wherein said bus waveguide and said drop waveguide are comprised of a photonic crystal.

33. The photonic device of claim 30, wherein said resonant frequencies are microwave, infrared, or visible frequencies.

34. The photonic device of claim 30, wherein an input data stream is provided to said bus waveguide, said input stream including one or more input frequencies of electromagnetic radiation, said one or more input frequencies including an input resonant frequency, said input resonant frequency corresponding to one of said resonant frequencies of said resonator, said input resonant frequency being transferred from said bus waveguide to said drop waveguide by said resonator.

35. The photonic device of claim 34, wherein said transfer occurs without reflection or transmission of said input resonant frequency from said resonator to said bus waveguide.

36. The photonic device of claim 34, wherein said transfer occurs substantially in the forward drop direction.

37. The photonic device of claim 34, further comprising means for providing energy to said phase change material, said means for providing energy providing energy in an amount sufficient to change the structural state of said phase change material.

38. The photonic device of claim 37, wherein said change in structural state changes the frequency of one or more of said resonant frequencies.

39. The photonic device of claim 37, wherein said change in structural state modulates said transfer.

40. The photonic device of claim 37, wherein said change in structural state switches said transfer.

41. The photonic crystal of claim 29, wherein said defect photonic state has a resonant frequency in the infrared.

42. The photonic crystal of claim 1, wherein said photonic crystal is two-dimensional.

43. The photonic crystal of claim 42, wherein said units of macroscopic dielectric medium are rods.

44. The photonic crystal of claim 43, wherein said rods are periodically arranged in a square lattice.

45. The photonic crystal of claim 43, wherein said rods are periodically arranged in a triangular lattice.

46. The photonic crystal of claim 43, wherein said rods have a non-circular cross-section.

47. The photonic crystal of claim 43, wherein said rods comprise said phase change material.

48. The photonic crystal of claim 47, wherein said phase change material forms a capping layer, an internal layer or a coating layer of said rod.

49. The photonic crystal of claim 47, wherein said rod further comprises a metallic layer or a protective layer.

50. An electromagnetic radiation frequency reflector comprising the photonic crystal of claim 1, said photonic crystal having a photonic band gap having a low frequency edge and a high frequency edge, said reflector reflecting incident light having a frequency in between said low frequency edge and said high frequency edge.

51. A method of tuning a photonic crystal, said method including the steps of:

providing the photonic crystal of claim 1, providing energy to said photonic crystal, said energy producing a change in the structural state of said phase change material.

* * * * *